(12) United States Patent
Faust, Jr. et al.

(10) Patent No.: US 10,745,608 B2
(45) Date of Patent: Aug. 18, 2020

(54) CLEANING AND REMOVAL OF WAX DEPOSITS IN OIL AND GAS WELLS USING CATIONIC POLYMERS

(71) Applicant: Ecolab USA Inc., St. Paul, MN (US)

(72) Inventors: Marcus D. Faust, Jr., Missouri City, TX (US); Tri T. Phan, Sugar Land, TX (US); Theophilus Edovia, Richmond, TX (US); Mathew Hancock, Windsor, CO (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/219,919

(22) Filed: Jul. 26, 2016

(65) Prior Publication Data

US 2017/0029691 A1    Feb. 2, 2017

Related U.S. Application Data

(60) Provisional application No. 62/197,393, filed on Jul. 27, 2015.

(51) Int. Cl.
| | |
|---|---|
| *C09K 8/524* | (2006.01) |
| *C09K 8/528* | (2006.01) |
| *C09K 8/532* | (2006.01) |
| *E21B 37/06* | (2006.01) |
| *E21B 43/12* | (2006.01) |

(52) U.S. Cl.
CPC .............. *C09K 8/524* (2013.01); *C09K 8/528* (2013.01); *C09K 8/532* (2013.01); *E21B 37/06* (2013.01); *E21B 43/126* (2013.01)

(58) Field of Classification Search
CPC ........... C09K 8/524; C09K 8/532; C09K 8/88

USPC ........................................................ 166/304
See application file for complete search history.

(56) References Cited

U.S. PATENT DOCUMENTS

| | | | |
|---|---|---|---|
| 5,458,198 A | 10/1995 | Hashemi et al. | |
| 7,159,655 B2* | 1/2007 | Ke | C09K 8/528 166/279 |
| 7,398,824 B1* | 7/2008 | Wang | C09K 8/528 166/279 |
| 7,918,281 B2* | 4/2011 | Brown | E21B 37/06 134/22.11 |
| 8,394,872 B2* | 3/2013 | Faust, Jr. | C08F 220/34 523/175 |
| 2010/0065275 A1* | 3/2010 | McGowen | C09K 8/524 166/304 |
| 2013/0274150 A1 | 10/2013 | Holt et al. | |

FOREIGN PATENT DOCUMENTS

WO    2014/075964 A1    5/2014

OTHER PUBLICATIONS

International Search Report and Written Opinion relating to PCT/US2016/043995 dated Oct. 26, 2016, 10 pages.

* cited by examiner

*Primary Examiner* — Angela M DiTrani Leff
*Assistant Examiner* — Ashish K Varma
(74) *Attorney, Agent, or Firm* — Stinson LLP

(57) ABSTRACT

The present invention generally relates to methods for removing deposits in an oil or gas well by contacting the annular fluid in a batch-wise method with an effective amount of a composition comprising a water-soluble copolymer. These methods are advantageous because they can be used as needed to improve well operation. The methods use a water-soluble copolymer comprised of an acrylamide monomer and one or more cationic monomer.

17 Claims, No Drawings

CLEANING AND REMOVAL OF WAX DEPOSITS IN OIL AND GAS WELLS USING CATIONIC POLYMERS

CROSS-REFERENCE TO RELATED APPLICATION

This application claims priority to U.S. Provisional Patent Application Ser. No. 62/197,393 filed on Jul. 27, 2015, the disclosure of which is incorporated herein by reference in its entirety.

FIELD OF THE INVENTION

The present invention generally relates to methods for removing deposits in an oil or gas well by contacting the annular fluid in a batch-wise method with an effective amount of a composition comprising a water-soluble copolymer. These methods are advantageous because they can be used as needed to improve well operation. The methods use a water-soluble copolymer comprised of an acrylamide monomer and one or more cationic monomer.

BACKGROUND OF THE INVENTION

Within the petroleum industry, crystallization and deposit formations during production, transportation, and storage of crude oils can be detrimental to the operation. These deposits can include organic deposits and inorganic deposits. These deposits and formations can occur on many surfaces within upstream and downstream operations. Further, these deposits can block pores in near-well formations and can form in the production tubing and downstream pipelines. Additionally, these deposits can also reduce pump efficiency.

Paraffinic deposits are comprised of long, straight and branched alkane compounds that are naturally present in crude oils. These alkanes can precipitate out of the crude oil and form paraffinic waxes. These specific deposits can reduce pipe flow, increase fluid viscosity, increase operating cost as efficiency is decreased, and can be challenging to remove.

Asphaltenes are highly prevalent in heavy crude oils and as a result require special attention during extraction and processing of these heavy crude oils. Asphaltene deposits can block reservoir pores in near-well formations, production tubing, and downstream pipelines.

Scale formation can arise in systems that contain ions, including calcium, strontium, and barium cations, and carbonate and sulfate anions. When concentrations and identities of ions provide soluble species then no deposits are formed. However, when concentrations of ions exceed the solubility limit for the particular species, then precipitation can occur and deposits can form. If left untreated, these deposits can have adverse effects on the general system that include fouling, reduction in efficiency, mechanical failures, or shut-down of the system for remediation.

A traditional method used to remove organic deposits from downhole wells is to heat water to a temperature well above the melting point of the organic deposits and then circulate the water down hole through the annular space and returning to the surface through the production tubing. This method can be inadequate in systems where the crude oil has particular components, including paraffin waxes.

Therefore, a need exists for alternative methods and compositions for cleaning and removing deposits on surfaces in an oil or gas well.

SUMMARY OF THE INVENTION

One aspect of the invention is a method for removing deposits in an oil or gas well by contacting the annular fluid in a batch-wise method with an effective amount of a composition comprising a water-soluble copolymer, wherein the produced fluid comprises at least about 10 vol % water.

Another aspect of the invention is a water-soluble copolymer comprising an acrylamide monomer and one or more cationic monomers.

Other objects and features will be in part apparent and in part pointed out hereinafter.

DESCRIPTION OF THE PREFERRED EMBODIMENTS

The present invention is directed towards methods for removing deposits in an oil or gas well. These methods involve contacting the annular fluid in a batch-wise fashion with an effective amount of a water-soluble copolymer. The methods are particularly advantageous for improving production pump efficiency, cleaning of pipelines, heat exchangers, or tubing.

The copolymer composition comprises an acrylamide monomer and a cationic monomer.

The cationic monomers are selected from a dimethylaminoethyl acrylate benzyl chloride quaternary salt, a dimethylaminoethyl acrylate methyl chloride quaternary salt, a dialkyldimethyl ammonium salt, a methacrylamido propyltrimethyl ammonium salt, a 3-(acryloylamino)propyl trimethyl ammonium salt, a 2-acryloyloxyethyltrimethyl ammonium salt, a 2-methacryloyloxyethyltrimethyl ammonium salt, a acryloyloxyethyldimethylbenzyl ammonium salt, a methacryloyloxyethyldimethylbenzyl ammonium salt, or a combination thereof.

Preferably, the water-soluble copolymer comprises acrylamide, dimethylaminoethyl acrylate benzyl chloride quaternary chloride, and dimethylaminoethyl acrylate methyl chloride quaternary chloride.

Preferably, the water-soluble copolymer comprises a molar ratio from about 1:2:1.3 to about 1:3:2 of acrylamide to dimethylaminoethyl acrylate benzyl chloride quaternary salt to dimethylaminoethyl acrylate methyl chloride quaternary salt. Preferably, the water-soluble copolymer has a molar ratio of about 1:2.5:1.6 of acrylamide to dimethylaminoethyl acrylate benzyl chloride quaternary salt to dimethylaminoethyl acrylate methyl chloride quaternary salt The activity by weight of the water-soluble copolymer is from about 1% to about 10%, from about 2% to about 10%, from about 3% to about 10%, from about 1% to about 9%, from about 1% to about 8%, or from about 1% to about 5%.

The weight average molecular weight of the water-soluble copolymer is from about 100,000 Da to about 10,000,000 Da; from about 100,000 Da to about 8,000,000 Da; from about 100,000 Da to about 5,000,000 Da; from about 500,000 Da to about 10,000,000 Da; from about 500,000 Da to about 8,000,000 Da; from about 500,000 Da to about 5,000,000 Da; from about 1,000,000 Da to about 10,000,000 Da; from about 1,000,000 Da to about 8,000,000 Da; preferably, from about 1,000,000 Da to about 5,000,000 Da.

The well deposits can comprise an organic solid, an inorganic solid, or a combination thereof.

The organic solid can comprise a paraffin, an asphaltene, a carboxylate salt, a naphthenate salt, or a combination thereof.

The inorganic solid can comprise calcium carbonate, calcium sulfate, strontium sulfate, barium sulfate, iron (II) sulfide, zinc sulfide, lead (II) sulfide, sodium chloride (halite), or a combination thereof.

The produced fluid can comprise at least about 10 vol. % water, at least about 15 vol. % water, at least about 20 vol. % water, at least about 25 vol. % water, at least about 30 vol. % water, at least about 35 vol. % water, at least about 40 vol. % water, at least about 45 vol. % water, or at least about 50 vol. % water.

The produced fluid can comprise from about 10 vol. % to about 60 vol. % water, from about 15 vol. % to about 60 vol. % water, from about 20 vol. % to about 60 vol. % water, from about 25 vol. % to about 60 vol. % water, from about 30 vol. % to about 60 vol. % water, from about 35 vol. % to about 60 vol. % water, from about 40 vol. % to about 60 vol. % water, from about 45 vol. % to about 60 vol. % water, or from about 50 vol. % to about 60 vol. % water.

The method can comprise injecting the composition into the well, wherein the injection can occur during normal operations. An effective amount of water-soluble copolymer is added wherein the concentration is from about 100 ppm to about 5,000 ppm; from about 100 ppm to about 2,000 ppm; from about 100 ppm to about 1,000 ppm; from about 100 ppm to about 800 ppm; from about 100 ppm to about 600 ppm; from about 200 ppm to about 5,000 ppm; from about 200 ppm to about 2,000 ppm; from about 200 ppm to about 1,000 ppm; from about 200 ppm to about 800 ppm; from about 200 ppm to about 600 ppm; from about 400 ppm to about 5,000 ppm; from about 400 ppm to about 2,000 ppm; from about 400 ppm to about 1,000 ppm; from about 400 ppm to about 800 ppm, based on the volume of the annular fluid; preferably, the water-soluble copolymer is added at a concentration from about 400 to about 600 ppm based on the annular fluid.

Water is added to the annular side of the well to enhance contact of the water-soluble copolymer with the produced fluid. Additionally, water is used to flush the well after the addition of the water-soluble copolymer. The amount of water used to flush the well is from about 5 times to about 15 times, from about 5 times to about 12 times, from about 5 times to about 10 times, from about 8 times to about 15 times, from about 8 times to about 12 times, or from about 8 times to about 10 times greater than the volume of the annular fluid.

The method described herein describes contacting the produced fluid with a water-soluble copolymer composition in a batch-wise manner.

The composition described herein could also be added to the produced fluid in a continuous flow method. Particularly, when the oil well is in fluid contact with a hydrocarbon reservoir that contains a waxy hydrocarbon, the treatment described herein could be a continuous treatment.

The method described herein allow for the injection to occur during normal well operations. Therefore, there is no service interruption during the cleaning and removal of paraffinic deposits.

The method described herein increases the oil flowability at the wellhead at ambient temperatures. Additionally, flowability can be improved during cold weather.

Delivery of the cationic polymeric material can be accomplished through preparation of a salt precipitated slurry. The slurry can be prepared by adding the polymer in dry powder form to a solution of brine containing 20% ammonium sulfate (or one or more equivalent highly water soluble salts). Other methods of preparing slurries are known in the art.

The polymer slurry can be freezing point depressed using additional ammonium chloride salts for use in cold regions without affecting the performance. An alternate delivery method is to use a slip-stream method to send produced water with some residual oil and water-soluble polymer back down-hole. This slip-streaming method would reduce overall chemical usage as part of the chemical would be recycled.

It should be appreciated that the polymers of the invention can be polymerized using conventional synthesis methods. Representative methods include batch polymerization using both radical and redox pair initiators, salt precipitation using both radical and redox pair initiators, latex or inverse latex polymerization using both radical and redox pair initiators, or another suitable method.

"Cationic Monomer" means a monomer which possesses a net positive charge. Cationic monomers can include a dimethylaminoethylacrylate alkyl salt; a cationic monomer having four carbons bonded to a single nitrogen to form a quaternary ammonium ion; a cationic monomer having two carbons singly bonded to a single nitrogen and one carbon doubly bonded to the nitrogen to form a quaternary imminium ion; a cationic amine monomer with a $C_1$ to $C_{24}$ alkyl chain or benzyl salts; the like; and combinations thereof.

Additional representative cationic monomers include a dialkylaminoalkyl acrylate, a dialkylaminoalkyl methacrylate, or a quaternary or acid salt thereof, including, but not limited to, a dimethylaminoethyl acrylate methyl chloride quaternary salt, a dimethylaminoethyl acrylate methyl sulfate quaternary salt, a dimethylaminoethyl acrylate benzyl chloride quaternary salt, a dimethylaminoethyl acrylate sulfuric acid salt, a dimethylaminoethyl acrylate hydrochloric acid salt, a dimethylaminoethyl methacrylate methyl chloride quaternary salt, a dimethylaminoethyl methacrylate methyl sulfate quaternary salt, a dimethylaminoethyl methacrylate benzyl chloride quaternary salt, a dimethylaminoethyl methacrylate sulfuric acid salt, a dimethylaminoethyl methacrylate hydrochloric acid salt; a dialkylaminoalkyl acrylamide or a dialkylaminoalkyl methacrylamide, or a quaternary or acid salt thereof including acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride, or diallyldimethyl ammonium chloride; a monomer having an aromatic group such as phenyl, benzyl, naphthyl, pyridyl, and the like; or a combination thereof. Alkyl groups are generally $C_1$ to $C_{24}$.

A useful cationic monomer has the structure of formula 1,

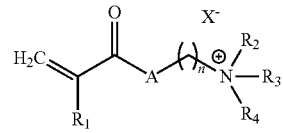

Formula 1 wherein $R_1$ is hydrogen or methyl, A is —O— or —NH—, n is an integer from 1 to 6, $R_2$, $R_3$, and $R_4$ are independently alkyl, aryl, or aralkyl, and $X^-$ is a counterion (e.g., Cl, Br, $SO_4$, and the like). Preferably, A is —O—, n is 2 or 3, and $R_2$, $R_3$, and $R_4$ are independently methyl, ethyl, or benzyl.

Another cationic monomer has the structure of formula 1A,

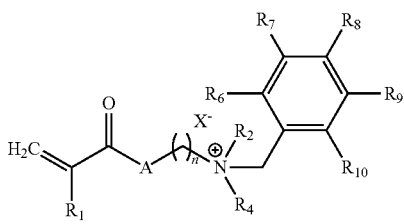

Formula 1A wherein $R_1$ is hydrogen or methyl, A is —O— or —NH—, n is an integer from 1 to 6, $R_2$ and $R_4$ are independently alkyl, $R_6$, $R_7$, $R_8$, $R_9$, and $R_{10}$ are independently hydrogen or alkyl, and $X^-$ is a counterion. Preferably, A is —O—, n is 2 or 3, $R_2$ and $R_4$ are independently methyl or ethyl, and $R_6$, $R_7$, $R_8$, $R_9$, and $R_{10}$ are hydrogen.

Another cationic monomer has the structure of formula 2,

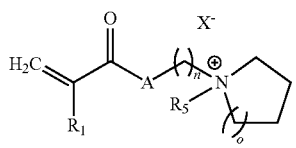

Formula 2 wherein $R_1$ is hydrogen or methyl, A is —O— or —NH—, n is an integer from 1 to 6, $R_5$ is alkyl, o is an integer of 1 or 2, and $X^-$ is a counterion. Preferably, A is —O—, n is 2 or 3, $R_5$ is methyl or ethyl, and o is 1.

The cationic monomer can also have the structure of formula 3,

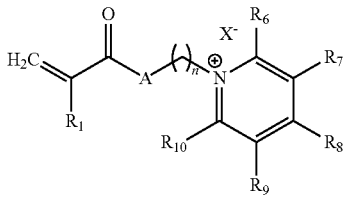

Formula 3 wherein $R_1$ is hydrogen or methyl, A is —O— or —NH—, n is an integer from 1 to 6, $R_6$, $R_7$, $R_8$, $R_9$, and $R_{10}$ are independently hydrogen or alkyl, and $X^-$ is a counterion. Preferably, A is —O—, n is 2 or 3, and $R_6$, $R_7$, $R_8$, $R_9$, and $R_{10}$ are hydrogen.

The water-soluble copolymer can additionally comprises nonionic monomers including acrylamide, methacrylamide, N-methylacrylamide, N,N-dimethyl(meth)acrylamide, N,N-diethyl(meth)acrylamide, N-isopropyl(meth)acrylamide, N-t-butyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol)monomethyl ether mono(meth)acrylate, N-vinyl-2-pyrrolidone, glycerol mono ((meth)acrylate), 2-hydroxyethyl(meth)acrylate, 2-hydroxypropyl(meth)acrylate, vinyl methylsulfone, vinyl acetate, glycidyl(meth)acrylate, or a combination thereof.

The composition can further comprise one or more additional components including but not limited to a corrosion inhibitor, a solvent, an asphaltene inhibitor, an additional paraffin inhibitor, a scale inhibitor, an emulsifier, a dispersant, an emulsion breaker, a gas hydrate inhibitor, a biocide, a pH modifier, and a surfactant. A composition of the invention can comprise from 0 to 10 percent by weight of one or more of these additional components, based on total weight of the composition.

Suitable corrosion inhibitors for inclusion in the compositions include, but are not limited to, alkyl, hydroxyalkyl, alkylaryl, arylalkyl or arylamine quaternary salts; mono or polycyclic aromatic amine salts; imidazoline derivatives; mono-, di- or trialkyl or alkylaryl phosphate esters; phosphate esters of hydroxylamines; phosphate esters of polyols; and monomeric or oligomeric fatty acids.

Suitable alkyl, hydroxyalkyl, alkylaryl arylalkyl or arylamine quaternary salts include those alkylaryl, arylalkyl and arylamine quaternary salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I. For example, $R^{5a}$, $R^{6a}$, $R^{7a}$, and $R^{8a}$ are each independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I.

Suitable quaternary ammonium salts include, but are not limited to, tetramethyl ammonium chloride, tetraethyl ammonium chloride, tetrapropyl ammonium chloride, tetrabutyl ammonium chloride, tetrahexyl ammonium chloride, tetraoctyl ammonium chloride, benzyltrimethyl ammonium chloride, benzyltriethyl ammonium chloride, phenyltrimethyl ammonium chloride, phenyltriethyl ammonium chloride, cetyl benzyldimethyl ammonium chloride, hexadecyl trimethyl ammonium chloride, dimethyl alkyl benzyl quaternary ammonium compounds, monomethyl dialkyl benzyl quaternary ammonium compounds, trimethyl benzyl quaternary ammonium compounds, and trialkyl benzyl quaternary ammonium compounds, wherein the alkyl group can contain between about 6 and about 24 carbon atoms, about 10 and about 18 carbon atoms, or about 12 to about 16 carbon atoms. Suitable quaternary ammonium compounds (quats) include, but are not limited to, trialkyl, dialkyl, dialkoxy alkyl, monoalkoxy, benzyl, and imidazolinium quaternary ammonium compounds, salts thereof, the like, and combinations thereof. The quaternary ammonium salt can be an alkylamine benzyl quaternary ammonium salt, a benzyl triethanolamine quaternary ammonium salt, a benzyl alkyl ($C_{12}$-$C_{18}$) dimethylammonium salt, or a benzyl dimethylaminoethanolamine quaternary ammonium salt.

The corrosion inhibitor can be a quaternary ammonium or alkyl pyridinium quaternary salt such as those represented by the general formula:

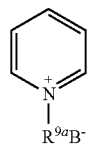

wherein $R^{9a}$ is an alkyl group, an aryl group, or an arylalkyl group, wherein said alkyl groups have from 1 to about 18 carbon atoms and B is Cl, Br or I. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium and an alkyl benzyl pyridinium chloride, preferably wherein the alkyl is a $C_1$-$C_6$ hydrocarbyl group. The corrosion inhibitor can include benzyl pyridinium chloride.

The corrosion inhibitor can be an imidazoline derived from a diamine, such as ethylene diamine (EDA), diethylene triamine (DETA), triethylene tetraamine (TETA) etc. and a long chain fatty acid such as tall oil fatty acid (TOFA). Suitable imidazolines include those of formula:

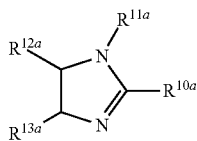

wherein $R^{12a}$ and $R^{13a}$ are independently a $C_1$-$C_6$ alkyl group or hydrogen, $R^{11a}$ is hydrogen, $C_1$-$C_6$ alkyl, $C_1$-$C_6$ hydroxyalkyl, or $C_1$-$C_6$ arylalkyl, and $R^{10a}$ is a $C_1$-$C_{20}$ alkyl or a $C_1$-$C_{20}$ alkoxyalkyl group. For example, $R^{11a}$, $R^{12a}$ and $R^{13a}$ are each hydrogen and $R^{10a}$ is the alkyl mixture typical in tall oil fatty acid (TOFA).

The corrosion inhibitor compound can be an imidazolinium compound of the following formula:

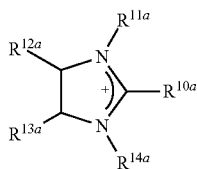

wherein $R^{12a}$ and $R^{13a}$ are independently a $C_1$-$C_6$ alkyl group or hydrogen, $R^{11a}$ and $R^{14a}$ are independently hydrogen, $C_1$-$C_6$ alkyl, $C_1$-$C_6$ hydroxyalkyl, or $C_1$-$C_6$ arylalkyl, and $R^{10}$ is a $C_1$-$C_{20}$ alkyl or a $C_1$-$C_{20}$ alkoxyalkyl group.

Suitable mono-, di- and trialkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethyl phosphate with triethylphosphate producing a more broad distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor compound can further be a monomeric or oligomeric fatty acid. Preferred are $C_{14}$-$C_{22}$ saturated and unsaturated fatty acids as well as dimer, trimer and oligomer products obtained by polymerizing one or more of such fatty acids.

Suitable asphaltene inhibitors include, but are not limited to, aliphatic sulphonic acids; alkyl aryl sulphonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

Additional paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylphenolic resins.

Suitable scale inhibitors include, but are not limited to, phosphates, phosphate esters, phosphoric acids, phosphonates, phosphonic acids, polyacrylamides, salts of acrylamido-methyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AMPS).

Suitable emulsifiers include, but are not limited to, salts of carboxylic acids, products of acylation reactions between carboxylic acids or carboxylic anhydrides and amines, and alkyl, acyl and amide derivatives of saccharides (alkylsaccharide emulsifiers).

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 nitrogen atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each nitrogen atom, at least 2 of the numbers of methylene groups in each phosphonate being different. Other suitable dispersion agents include lignin or derivatives of lignin such as lignosulfonate and naphthalene sulfonic acid and derivatives.

Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, and resins, such as phenolic and epoxide resins.

Suitable hydrogen sulfide scavengers include, but are not limited to, oxidants (e.g., inorganic peroxides such as sodium peroxide, or chlorine dioxide), aldehydes (e.g., of 1-10 carbons such as formaldehyde or glutaraldehyde or (meth)acrolein), triazines (e.g., monoethanol amine triazine, monomethylamine triazine, and triazines from multiple amines or mixtures thereof), and glyoxal.

Suitable gas hydrate inhibitors include, but are not limited to, thermodynamic hydrate inhibitors (THI), kinetic hydrate inhibitors (KHI), and anti-agglomerates (AA).

Suitable thermodynamic hydrate inhibitors include, but are not limited to, NaCl salt, KCl salt, CaCl$_2$ salt, MgCl$_2$ salt, NaBr$_2$ salt, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

Suitable kinetic hydrate inhibitors and anti-agglomerates include, but are not limited to, polymers and copolymers, polysaccharides (such as hydroxy-ethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

Suitable biocides include, but are not limited to, oxidizing and non-oxidizing biocides.

Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., bronopol and 2-2-dibromo-3-nitrilopropionamide (DB-NPA)), sulfur compounds (e.g., isothiazolone, carbamates, and metronidazole), and quaternary phosphonium salts (e.g., tetrakis(hydroxymethyl)phosphonium sulfate (THPS)).

Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include NaOH, KOH, Ca(OH)$_2$, CaO, Na$_2$CO$_3$, KHCO$_3$, K$_2$CO$_3$, NaHCO$_3$, MgO, and Mg(OH)$_2$.

Suitable surfactants include, but are not limited to, anionic surfactants, cationic surfactants, zwitterionic surfactants, and nonionic surfactants.

Additional anionic surfactants include alkyl carboxylates and alkyl ether carboxylates, alkyl and ethoxylated alkyl phosphate esters, and mono and dialkyl sulfosuccinates and sulfosuccinamates.

Cationic surfactants include alkyl trimethyl quaternary ammonium salts, alkyl dimethyl benzyl quaternary ammonium salts, dialkyl dimethyl quaternary ammonium salts, and imidazolinium salts.

Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, alkoyl polyethylene glycol esters and diesters, betaines, and sultanes. Amphoteric surfactants such as alkyl amphoacetates and amphodiacetates, alkyl amphopropionates and amphodipropionates, and alkyliminodipropionate can also be used.

The surfactant can be a quaternary ammonium compound, an amine oxide, an ionic or non-ionic surfactant, or any combination thereof.

Suitable quaternary amine compounds include, but are not limited to, alkyl benzyl ammonium chloride, benzyl cocoalkyl(C$_{12}$-C$_{18}$)dimethylammonium chloride, dicocoalkyl (C$_{12}$-C$_{18}$)dimethylammonium chloride, ditallow dimethylammonium chloride, di(hydrogenated tallow alkyl) dimethyl quaternary ammonium methyl chloride, methyl bis(2-hydroxyethyl cocoalkyl(C$_{12}$-C$_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhexyl) dimethyl quaternary ammonium methyl sulfate.

The compositions can further include additional functional agents or additives that provide a beneficial property, such as pH adjusters or other neutralizing agents, emulsifiers, sequestrants, solubilizers, other lubricants, buffers, detergents, cleaning agents, rinse aids, preservatives, binders, thickeners or other viscosity modifiers, processing aids, foam inhibitors or foam generators, threshold agent or system, aesthetic enhancing agent (i.e., dye, odorant, perfume, and mixtures thereof. Additional agents or additives will vary according to the particular composition being manufactured and its intend use as one skilled in the art will appreciate.

Alternatively, the compositions can not contain any of the additional agents or additives.

Unless otherwise indicated, an alkyl group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The terms "aryl" or "ar" as used herein alone or as part of another group (e.g., aralkyl) denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl. The term "aryl" also includes heteroaryl.

The term "substituted" as in "substituted aryl," "substituted alkyl," and the like, means that in the group in question (i.e., the alkyl, aryl or other group that follows the term), at least one hydrogen atom bound to a carbon atom is replaced with one or more substituent groups such as hydroxy (—OH), alkylthio, phosphino, amido (—CON(R$_A$)(R$_B$), wherein R$_A$ and R$_B$ are independently hydrogen, alkyl, or aryl), amino(—N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

"Arylalkyl" means an aryl group attached to the parent molecule through an alkylene group. The number of carbon atoms in the aryl group and the alkylene group is selected such that there is a total of about 6 to about 18 carbon atoms in the arylalkyl group. A preferred arylalkyl group is benzyl.

Having described the invention in detail, it will be apparent that modifications and variations are possible without departing from the scope of the invention defined in the appended claims.

EXAMPLES

The following non-limiting examples are provided to further illustrate the present invention.

Examples 1 and 2 were performed at a field site where highly paraffinic crude oils are produced from two separate formations. A composition consisting of acrylamide to dimethylaminoethyl acrylate benzyl chloride quaternary salt to dimethylaminoethyl acrylate methyl chloride quaternary salt in a 1:2.5:1.6 molar ratio (available commercially from Nalco-Champion, identified hereinafter as composition A) was used during the field test. In a batch treatment, three gallons of composition A was pumped downhole and flushed with 80 gallons of produced water. After about 6 hours, pumping was turned on with a treating rate of 6 quarts per day (500 ppm).

Example 1

Oil-in-Water Analysis of Produced Water

Produced water samples (50 mL) were collected at various time points before and after injection of composition A. After the water samples were collected, two drops (about 100 µL) of 15% hydrochloric acid solution were added to the sample in order to degas and adjust the pH to between 2 and 3. Hexane (amount equal to 10% volume of sample collected) was then added to the sample as an extraction solvent. The sample was then vigorously shaken for approximately one minute and then left undisturbed for the solvent to separate out. An aliquot (300 µL) of the extract was transferred to a cuvette and measured using a handheld oil-in-water analyzer (Turner TD500, Turner Design Hydrocarbon Instruments, Inc.). Results from the oil-in-water analysis are shown in Table 1.

TABLE 1

Oil-in-water concentration of the produced water samples collected before and after injection of composition A.

|  | Sampling date and time | | Oil-in-water concentration (ppm) |
|---|---|---|---|
| Before injection of composition A | Day 1 | 8:44 am | 447 |
| 24 hours after injection of | Day 2 | 08:40 am | 4,859 |
|  |  | 10:30 am | 1,785 |

TABLE 1-continued

Oil-in-water concentration of the produced water samples collected before and after injection of composition A.

|  | Sampling date and time | Oil-in-water concentration (ppm) |
|---|---|---|
| composition A | 12:30 pm | 1,950 |
|  | 2:30 pm | 473 |
|  | 3:30 pm | 153 |

Batch-wise treatment of composition A resulted in high oil-in-water based on the samples collected over the short time frame. Not bound any particular theory, it is believed that the increased oil-in-water was due to scale and paraffin deposits from the well that were washed out following the batch treatment of composition A.

Example 2

Dynamometer Test

During the field trial, several dynamometer tests were performed to evaluate rod pump performance. Results from the test are presented in Table 2.

TABLE 2

Dynamometer data before and during the treatment period.

| Parameters | Before treatment | 5 days after treatment started | 3 weeks after treatment started | 3 weeks after treatment ended |
|---|---|---|---|---|
| Effective plunger stroke (in) | 0.29 | 8.13 | 78.67 | 48.05 |
| Max plunger stroke (in) | 138.15 | 147.31 | 139.04 | 139.41 |
| Volumetric efficiency (pump fillage) (%) | 0.2 | 5.5 | 56.6 | 34.5 |

The data above presents key operating parameters (from dynamometer tests) in a well rod pump before, during and after treatment with Composition A. The primary conclusions from this data indicate that the downhole application of Composition A increased rod pump efficiency. Pump fillage was 0.2% prior to treatment with Composition A and increased to 5.5% after five days and 56.6% after three weeks of treatment with Composition A. At 56.6% pump fillage, the pump carried 283% more fluid for every pump stroke than before treatment with Composition A. The observed increase in pump efficiency may be due to a combination of factors, including 1) reduced friction load attributable to the improved flowability of the produced fluids 2) removal of the scale and paraffin deposits that were washed out by the application of Composition A. Other parameters such as pump load and horse power also showed positive movement during the trial. Three weeks after treatment with Composition A was concluded, the pump fillage had dropped back to 34.5%. This slow decline of pump fillage suggests inorganic and/or organic deposits may have started to reform in the well. In addition to possible topside flow improvement, this data suggests the downhole application of Composition A may have additional benefits in terms of reduced operating cost due to improved pump performance.

After downhole application of composition A, it can be concluded that there was an increased rod pump efficiency and pump fillage which ultimately carries more fluid per every stroke than before treatment.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

What is claimed is:

1. A method for removing a deposit in an oil or gas well, the method comprising adding a water-soluble copolymer composition batch-wise to an annular fluid in the well, wherein the water-soluble copolymer has a concentration from about 100 ppm to about 5,000 ppm based on the total volume of the annular fluid in the well; and
   adding water to the annular side of the well in an amount from about 5 times to about 15 times the volume of the annular fluid in the well, thereby removing a deposit from the well;
   wherein a produced fluid comprises at least about 10 vol % water and the deposit comprises an organic solid and the organic solid comprises a paraffin, an asphaltene, a carboxylate salt, a naphthenate salt, or a combination thereof.

2. The method of claim 1, wherein the water-soluble copolymer is derived from an acrylamide monomer and a cationic monomer.

3. The method of claim 2, wherein the cationic monomer is a dimethylaminoethyl acrylate benzyl chloride quaternary salt, a dimethylaminoethyl acrylate methyl chloride quaternary salt, a dialkyldimethyl ammonium salt, a methacrylamido propyltrimethyl ammonium salt, a 3-(acryloylamino) propyl trimethyl ammonium salt, a 2-acryloyloxyethyltrimethyl ammonium salt, a 2-methacryloyloxyethyltrimethyl ammonium salt, an acryloyloxyethyldimethylbenzyl ammonium salt, a methacryloyloxyethyldimethylbenzyl ammonium salt, or a combination thereof.

4. The method of claim 2, wherein the acrylamide monomer comprises acrylamide.

5. The method of claim 2, wherein the cationic monomer comprises dimethylaminoethyl acrylate benzyl chloride quaternary salt and dimethylaminoethyl acrylate methyl chloride quaternary salt.

6. The method of claim 5, wherein the water-soluble copolymer has a molar ratio of acrylamide to dimethylaminoethyl acrylate benzyl chloride quaternary salt to dimethylaminoethyl acrylate methyl chloride quaternary salt from about 1:2:1.3 to about 1:3:2.

7. The method of claim 5, wherein the water-soluble copolymer has a molar ratio of acrylamide to dimethylaminoethyl acrylate benzyl chloride quaternary salt to dimethylaminoethyl acrylate methyl chloride quaternary salt of about 1:2.5:1.6.

8. The method of claim 5, wherein the water-soluble copolymer composition comprises from about 1% to about 10% by weight of the water-soluble copolymer.

9. The method of claim 1, wherein the water-soluble copolymer has a weight average molecular weight of from about 100,000 Da to about 10,000,000 Da.

10. The method of claim 1, wherein the water-soluble copolymer has a weight average molecular weight of from about 1,000,000 Da to about 5,000,000 Da.

11. The method of claim 1, wherein the produced fluid comprises at least about 15 vol % water.

12. The method of claim 11, wherein the produced fluid comprises at least about 20 vol % water.

13. The method of claim 11, wherein the produced fluid comprises at least about 25 vol % water.

14. The method of claim 1, wherein the concentration of the water-soluble copolymer is from about 400 to about 600 ppm.

15. A method for removing a deposit in an oil or gas well, the method comprising adding a water-soluble copolymer composition batch-wise to an annular fluid in the well, wherein the water-soluble copolymer has a concentration from about 100 ppm to about 5,000 ppm based on the total volume of the annular fluid in the well and the water-soluble copolymer is derived from an acrylamide monomer and a cationic monomer; and
   adding water to the annular side of the well separately from and after the water-soluble copolymer in an amount from about 5 times to about 15 times the volume of the annular fluid in the well, thereby removing a deposit from the well;
   wherein a produced fluid comprises at least about 10 vol % water and the deposit comprises an organic solid and the organic solid comprises a paraffin, an asphaltene, a carboxylate salt, a naphthenate salt, or a combination thereof.

16. A method for removing a deposit in an oil or gas well, the method comprising adding a water-soluble copolymer composition batch-wise to an annular fluid in the well, wherein the water-soluble copolymer has a concentration from about 100 ppm to about 5,000 ppm based on the total volume of the annular fluid in the well; and
   adding water to the annular side of the well in an amount from about 5 times to about 15 times the volume of the annular fluid in the well;
   wherein a produced fluid comprises at least about 10 vol % water, thereby removing a deposit from the well; and
   wherein the water-soluble copolymer composition is added to the annular fluid in the well during production of the produced fluid through the oil or gas well and the deposit comprises an organic solid and the organic solid comprises a paraffin, an asphaltene, a carboxylate salt, a naphthenate salt, or a combination thereof.

17. The method of claim 16, wherein the water-soluble copolymer composition is pumped into the well through the annular side of the well.

* * * * *